US011620437B2

(12) United States Patent
Deleuze et al.

(10) Patent No.: US 11,620,437 B2
(45) Date of Patent: Apr. 4, 2023

(54) SEMANTIC CORRECTION OF MESSAGES FOR GROUPS

(71) Applicant: International Business Machines Corporation, Armonk, NY (US)

(72) Inventors: Ivan Deleuze, Montpellier (FR); Joyce Miryam Habbouche, Ottawa (CA); Vinod A. Valecha, Pune (IN); Hemant Kumar Sivaswamy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/834,147

(22) Filed: Mar. 30, 2020

(65) Prior Publication Data

US 2021/0303775 A1 Sep. 30, 2021

(51) Int. Cl.
*G06F 40/166* (2020.01)
*G06F 40/30* (2020.01)

(52) U.S. Cl.
CPC .......... *G06F 40/166* (2020.01); *G06F 40/30* (2020.01)

(58) Field of Classification Search
CPC .................................................... G06F 40/169
See application file for complete search history.

(56) References Cited

U.S. PATENT DOCUMENTS

| 7,712,024 | B2 | 5/2010 | Reynar |
| 8,832,197 | B2 | 9/2014 | Lang |
| 9,166,939 | B2 | 10/2015 | Rasmussen et al. |

(Continued)

FOREIGN PATENT DOCUMENTS

| CA | 2177942 C | 3/2002 |
| CN | 103249015 A | 8/2013 |

(Continued)

OTHER PUBLICATIONS

Screen captures from YouTube video clip entitled "Unsend or Delete a Sent Message in Facebook Messenger" 2 pages, uploaded on Feb. 10, 2019 by user "Mike". Retrieved from Internet: <https://www.youtube.com/watch?v=C8KwnmN1ehc>.*

(Continued)

*Primary Examiner* — Justin S Lee
(74) *Attorney, Agent, or Firm* — Grant Johnson

(57) ABSTRACT

A method, text correction system, and computer program product, one embodiment of which may comprise receiving an original first message from a first participant of a group correspondence, receiving a second message from a second participant of the group correspondence, determining, by semantically analyzing the original first message and the second message, that the second message contains a desired modification of the original first message, and in response to the determining, automatically modifying the original first message with the desired modification to produce a modified first message. The second message may be received after the original first message. Optionally, some embodiments may further comprise presenting the modified first message to the first participant of the group correspondence for approval, and in response to an approval by the first participant of the group correspondence, presenting the modified first message to one or more other participants of the group correspondence.

21 Claims, 11 Drawing Sheets

(56) References Cited

U.S. PATENT DOCUMENTS

| | | | |
|---|---|---|---|
| 10,489,506 B2 | 11/2019 | Cietwierkowski et al. | |
| 2008/0162643 A1 | 7/2008 | Flach | |
| 2009/0327914 A1* | 12/2009 | Adar | G06F 16/958 715/745 |
| 2011/0313757 A1* | 12/2011 | Hoover | G06F 40/205 704/9 |
| 2011/0320548 A1 | 12/2011 | Jonsson | |
| 2016/0147731 A1 | 5/2016 | Parikh | |
| 2016/0170958 A1 | 6/2016 | Chan et al. | |
| 2017/0337176 A1 | 11/2017 | Cietwierkowski | |
| 2018/0329982 A1 | 11/2018 | Patel | |
| 2019/0286711 A1 | 9/2019 | Terry | |
| 2019/0361981 A1 | 11/2019 | Leydon et al. | |

FOREIGN PATENT DOCUMENTS

| | | |
|---|---|---|
| CN | 105872997 A | 8/2016 |
| WO | 2013143233 A1 | 10/2013 |

OTHER PUBLICATIONS

Jones et al., "Contextual Spelling Correction Using Latent Semantic Analysis" ANLC '97: Proceedings of the Fifth Conference on Applied Natural Language Processing, Mar. 1997 pp. 166-173. (Year: 1997).

Wang et al., "An Intelligent Semantic Agent for e-Learning Message Communication" Proceedings of the 19th International Conference on Advanced Information Networking and Applications (AI NA'05), copyright 2005 IEEE, 4 pages. (Year: 2005).

Deleuze et al., "Semantic Correction of Messages," U.S. Appl. No. 16/834,082, filed Mar. 30, 2020.

"The Stanford Parser: A statistical parser," The Stanford Natural Language Processing Group, Printed Nov. 18, 2019, 12 pages, https://nlp.stanford.edu/software/lex-parser.shtml.

"How to check whether a sentence is correct (simple grammar check in Python)?," Stack Overflow, Printed Nov. 18, 2019, 1 pages, https://stackoverflow.com/questions/10252448/how-to-check-whether-a-sentence-is-correct-simple-grammar-check-in-python.

Deleuze, "Dyamic Text Correction," U.S. Appl. No. 16/353,572, filed Mar. 14, 2019.

"Determine if a sentence is an inquiry," Stack Overflow, Printed Nov. 18, 2019, 1 page https://stackoverflow.com/questions/4083060/determine-if-a-sentence-is-an-inquiry.

Mell et al., "The NIST Definition of Cloud Computing," Recommendations of the National Institute of Standards and Technology, U.S. Department of Commerce, Special Publication 800-145. Sep. 2011, 7 pages.

List of IBM Patents or Patent Applications Treated as Related, Dated Mar. 24, 2020, 2 pages.

* cited by examiner

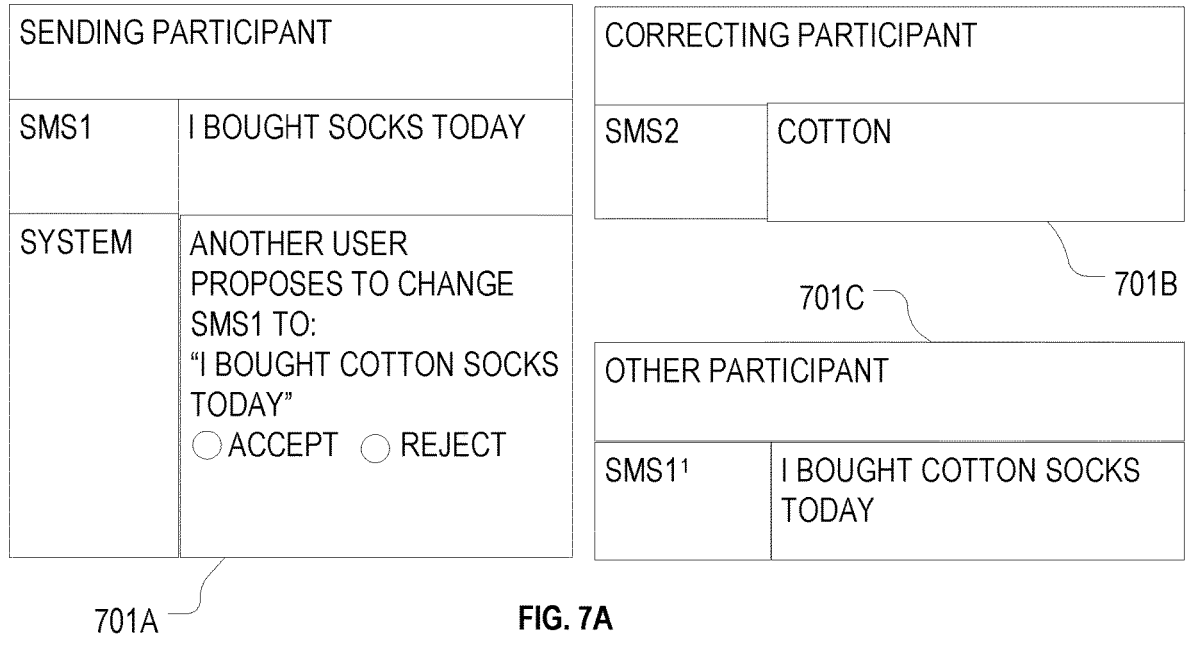
FIG. 7A
FIG. 7B
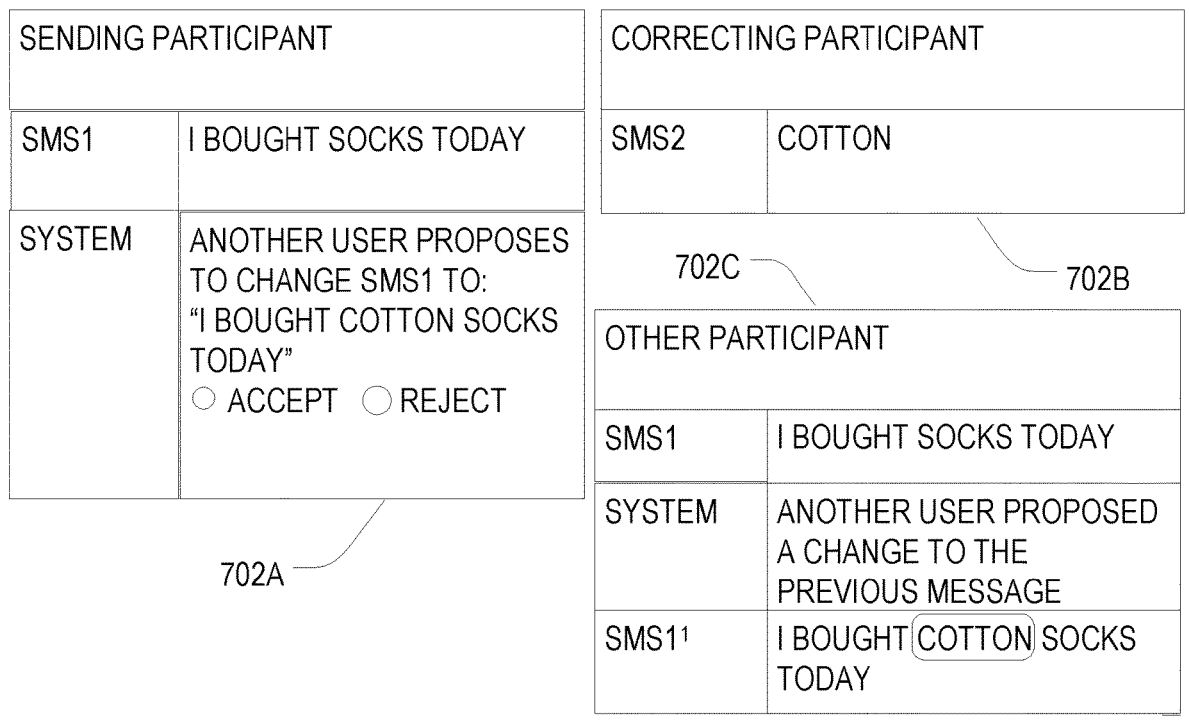

| SENDING PARTICIPANT | | CORRECTING PARTICIPANT | |
|---|---|---|---|
| SMS1 | PLEASE OPEN THE OOR | SMS2 | D |
| SYSTEM | ANOTHER USER PROPOSES TO CHANGE SMS1 TO: "PLEASE OPEN THE DOOR" ○ ACCEPT ○ REJECT | | |

801C — 801B

| OTHER PARTICIPANT | |
|---|---|
| SMS1¹ | PLEASE OPEN THE DOOR |

| SENDING PARTICIPANT | | CORRECTING PARTICIPANT | |
|---|---|---|---|
| SMS1 | PLEASE OPEN THE OOR | SMS2 | D |
| SYSTEM | ANOTHER USER PROPOSES TO CHANGE SMS1 TO: "PLEASE OPEN THE DOOR" ○ ACCEPT ○ REJECT | | |

802B

| OTHER PARTICIPANT | |
|---|---|
| SMS1 | PLEASE OPEN THE OOR |
| SYSTEM | ANOTHER USER PROPOSED A CHANGE TO THE PREVIOUS MESSAGE |
| SMS1¹ | PLEASE OPEN THE DOOR |

802A

802C

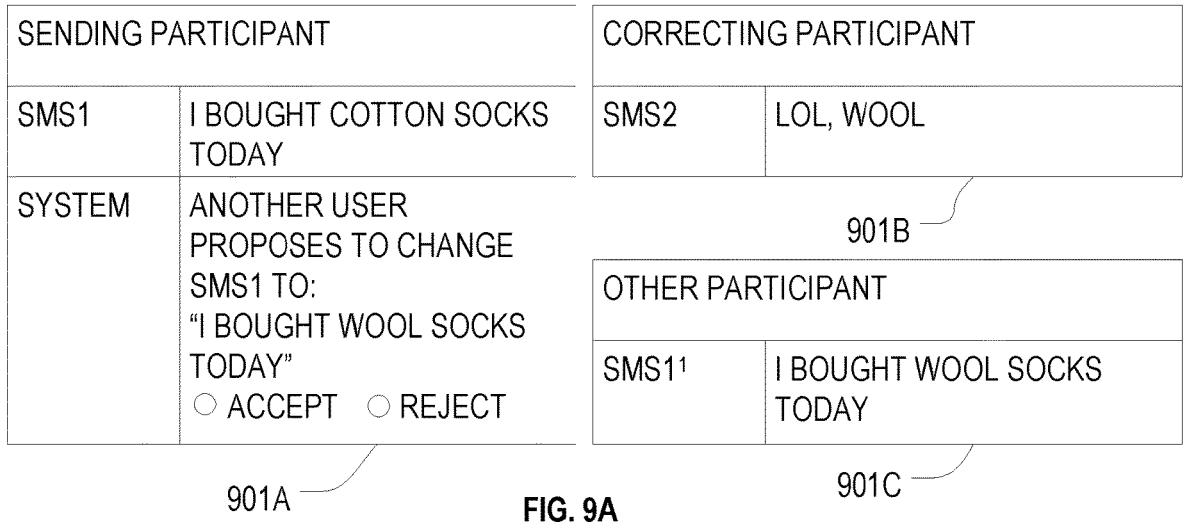
FIG. 9A
FIG. 9B
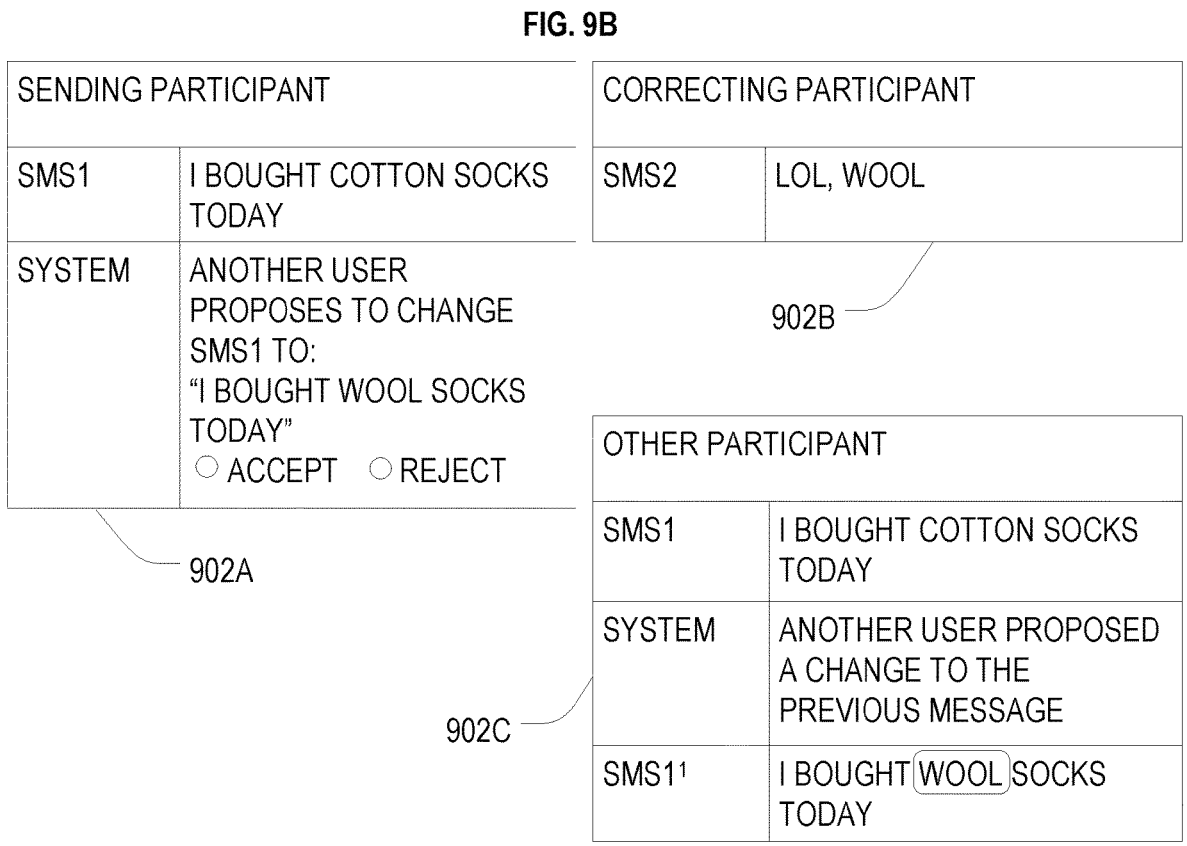

SEMANTIC CORRECTION OF MESSAGES FOR GROUPS

BACKGROUND

The present disclosure relates generally to the field of electronic communications, and more specifically, to aspects relating to identifying and correcting ambiguous and/or erroneous language in electronic messaging systems.

The development of the EDVAC computer system of 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push the performance of the computer higher and higher, even more advanced computer software has evolved to take advantage of the higher performance of the hardware, resulting in computer systems today that are much more powerful than just a few years ago.

Electronic communication devices are a type of computer system that allow users to send electronic messages (e.g., short message service (SMS) text messages, email, Internet-based instant messaging services, internet relay chat (IRC), message boards, chat capabilities in conferencing software and systems, chat capabilities in multi-player video game software, etc., generically referred to herein as "message" or "messages") to one another over a network. Common examples of these electronic communication devices include smartphones, tablets, video game systems, "smart" devices, and personal computers containing special purpose messaging applications and/or general purpose web browsing software. The resulting messages may contain text, pictures, video, and/or recorded audio. In some systems, resulting messages may be sent, or otherwise made available, to multiple recipients.

Messaging has become a common and convenient way of communicating between people and to other computing systems (e.g., bots). The very convenience of messaging, however, leads to a degree of informality. In response, most message systems offer some sort of correcting mechanisms, but quick typing or general inattention can still lead to unrecognized errors. In particular, a message may contain an error and/or ambiguity unrecognized by the sender before sending. Correcting or pointing out such an error and/or ambiguity in another participant's message may take time and may disrupt the flow of the message conversation, particularly in larger groups. It may also require knowledge of arcane editing conventions and procedures.

This issue may be magnified as messaging systems begin to replace face-to-face communication in many business settings. Looking forward, the textual records that result from a series of messages may become important evidence in disputes between the parties, or even the de facto record of legally significant communications. Accordingly, accuracy and clarity of messages between participants may become increasingly important.

U.S. Pat. No. 8,832,197 describes an application that allows a user to participate in a collaborative discussion. A user may act as an administrator to create the collaborate discussion and configure parameters of the collaborative discussion. The user can present a structured and objective collaborative element, such as a "yes or no" vote, the submission of a specific suggestion in response to a query, or the selection of one or more items from a list of choices. However, this system does not provide capability to correct and/or amend others' content.

SUMMARY

According to some embodiments of the present disclosure, a computer-implemented method comprising receiving an original first message from a first participant of a group correspondence, receiving a second message from a second participant of the group correspondence, determining, by semantically analyzing the original first message and the second message, that the second message contains a desired modification of the original first message, and in response to the determining, automatically modifying the original first message with the desired modification to produce a modified first message. The second message in some embodiments may be received after the original first message. One advantage of these embodiments may be that they provide participants with the capability to correct and/or amend others' messages. Optionally, some embodiments may further comprise presenting the modified first message to the first participant of the group correspondence for approval, and in response to an approval by the first participant of the group correspondence, presenting the modified first message to one or more other participants of the group correspondence. One advantage of these optional embodiments may be that they provide the first participant with an opportunity to approve any corrections to their messages proposed by others.

According to some embodiments of the present disclosure, a computer-implemented method comprising receiving, via a network interface, an original first message from a first participant of a group correspondence, receiving, via the network interface, a second message from a second participant of the group correspondence, receiving, via the network interface, a third message, and in response to the third message, automatically modifying the original first message with the desired modification to produce a modified first message. In some embodiments, the second message is received from the second participant after the original first message from the first participant, the second message contains a proposed modification of the original first message, and the third message includes control signals indicating that the first participant has approved the proposed modification from the second participant. One advantage of these embodiments may be that they provide participants with the capability to correct and/or amend others' messages. Another advantage of these embodiments may be that they provide the first participant with an opportunity to approve any corrections to their messages proposed by others.

According to some embodiments of the present disclosure, a text correction system comprising a server communicatively coupled to a plurality of message devices, wherein the server comprises a processor coupled to a memory. The processor and the memory may be configured to receive an original first message from a first participant of a group correspondence, receive a second message from a second participant of the group correspondence, wherein the second message is received after the original first message, determine, by semantically analyzing the original first message and the second message, that the second message contains a desired modification of the original first message, and in response to the determining, automatically modify the original first message with the desired modification. One advantage of these embodiments may be that they provide participants with the capability to correct and/or amend others' messages. Optionally, in some embodiments, the processor and memory may be further configured to present the modified first message to the first participant of the group correspondence for approval, and in response to an approval by the first participant of the group correspondence, present the modified first message to one or more other participants of the group correspondence. One advantage of these optional embodiments may be that they provide the first participant with an opportunity to approve any corrections to their messages proposed by others.

According to some embodiments of the present disclosure, a messaging client, comprising a processor coupled to a memory. The processor and the memory may be configured to receive an original first message from a first participant of a group correspondence, receive a second message from a second participant of the group correspondence, receive a third message, and in response to the third message, automatically modify the original first message with the desired modification. In some embodiments, the second message may be received from the second participant after the original first message from the first participant, the second message may contain a proposed modification of the original first message, and third message may include control signals indicating that the first participant has approved the proposed modification from the second participant. One advantage of these embodiments may be that they provide participants with the capability to correct and/or amend others' messages. Another advantage of these embodiments may be that they provide the first participant with an opportunity to approve any corrections to their messages proposed by others.

According to some embodiments of the present disclosure, a computer program product comprising a computer-readable storage medium having program instructions embodied therewith. The program instructions may be executable by a processor to cause the processor to receive an original first message from a first participant of a group correspondence, receive a second message from a second participant of the group correspondence, wherein the second message is received after the original first message, determine, by semantically analyzing the original first message and the second message, that the second message contains a desired modification of the original first message, and in response to the determining, automatically modifying the original first message with the desired modification to produce a modified first message. One advantage of these embodiments may be that they provide participants with the capability to correct and/or amend others' messages. Optionally, in some embodiments, the computer program may further comprise program instructions to present the modified first message to the first participant of the group correspondence for approval, and in response to an approval by the first participant of the group correspondence, present the modified first message to one or more other participants of the group correspondence. One advantage of these optional embodiments may be that they provide the first participant with an opportunity to approve any corrections to their messages proposed by others.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 7A illustrates example displays that may result from executing one computer-implemented process for correcting an unread message, in accordance with embodiments.

FIG. 7B illustrates example displays that may result from executing one computer-implemented process for correcting a read message, in accordance with some embodiments.

FIG. 8A illustrates example displays that may result from executing one computer-implemented process for inserting a letter into a word in an unread message, in accordance with some embodiments.

FIG. 8B illustrates example displays that may result from executing one computer-implemented process for inserting a letter into a word in a read message, in accordance with some embodiments.

FIG. 9A illustrates example displays that may result from executing one computer-implemented process for substituting a word in an unread message, in accordance with some embodiments.

FIG. 9B illustrates example displays that may result from executing one computer-implemented process for substituting a word in a read message, in accordance with embodiments.

Figure 1:
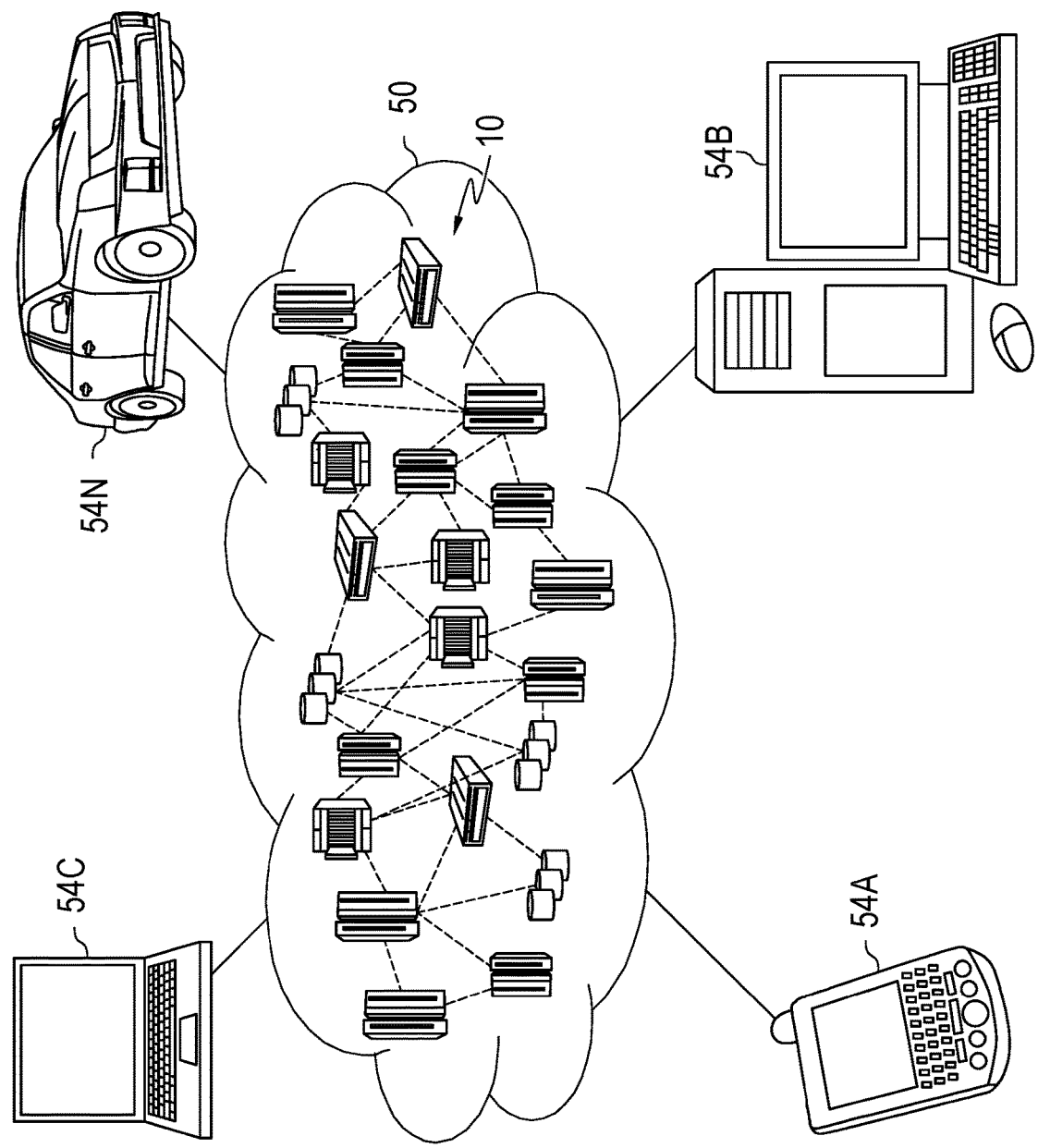
FIG. 1 depicts a cloud computing environment, in accordance with some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to electronic communication, and more particularly, aspects relate to identifying and correcting ambiguous and/or erroneous language in electronic messaging systems. While the present disclosure is not necessarily limited to such applications, various aspects of the disclosure may be appreciated through a discussion of various examples using this context.

Within different software, tools and even operating systems, different auto-correction tools exist, each with their own logic that attempts to correct user input when a word is typed out that is not directly known by the tool. One technical problem with these tools, however, is their inability to utilize the context around the typed message(s) to detect errors in and/or correctly apply user corrections to a previous message. In particular, much of the context of a conversation cannot be inferred merely by considering the history of the input(s) that the user(s) have provided. For example, in many conversations, correct inferencing requires access to certain facts outside the textual exchange and machine-accessible knowledge of shared experiences among the participants. This technical problem can be particularly difficult when one participant in a conversation is trying to correct another user.

In this disclosure, a system for integrating user message corrections is provided as a potential technical solution that may offer the ability for participants to "fix" or "append" messages posted by another user. Some embodiments may further offer the ability to propose those edits in a simple, natural language manner. In this way, some embodiments provide capabilities to determine to which previous message a proposed edit applies and to incorporate the edits into that message. Using this functionality, human participants may identify errors using knowledge not available to machine learning systems and propose corrections that are easily incorporated by the system into corrected messages. The machines, in turn, simplify the process of making, submitting, and verifying the proposed corrections. Taken together, the system may enable a more effective mechanism for correcting messages.

Advantageously, some embodiments may use natural language processing (NLP) for the semantic analysis described herein to read and interpret the semantic meaning of messages in a conversation, to look for patterns that indicate that a "correcting" participant in a direct chat or a group chat session wants to modify a message sent by another "sending" participant in the direct or group chat. Some embodiments may include an approval protocol, whereby the sending participant is given the opportunity to accept or reject a proposed correction before it is presented to the other participants in the group chat and/or before the proposed correction is made to the chat transcript. Some embodiments may include a server-based set of program instructions to determine whether or not each participant in a discussion has read the "original" version of the message (i.e., to which the correction is proposed), and may also have an awareness of the rhythm of a discussion. Other embodiments may be primarily implemented on one or all of the client devices used by the participants. Moreover, some client or server embodiments may, in a first phase, look for the event that indicates the participant wants to fix an error or ambiguity that was made by another participant, or otherwise modify the language in the earlier message from the other participant.

As a first illustrative example:
participant0: Did you meet the customer yesterday?
participant2: Yes we do.
participant1: Yes, they want cotton and socks for their shop.
participant2: wool In this example, some embodiments may analyze the first message ("Did you meet the customer yesterday?") as a semantically valid message, and thus, not trigger any additional events. Some embodiments may then analyze the second message ("Yes we do.") as a semantically valid response to the first message, despite its grammar error ("do", instead of "did"), and also not trigger any additional events (alternately, in some embodiments, such grammar errors may trigger additional events). Similarly, the third message ("Yes, they want cotton and socks for their shop.") may be analyzed as semantically valid response to the first message, again despite its grammar errors, and not trigger any additional events (alternately, in some embodiments, such grammar errors may trigger additional events). However, some embodiments may determine that the fourth message ("wool") is neither a valid sentence nor a valid response to an earlier message. Accordingly, some embodiments may internally trigger additional events based on message four.

In some embodiments, those additional events may include determining whether message four ("wool") could form a semantically valid and semantically more likely response (i.e. having a high semantic correctness score) when combined with: (i) an adjustable/tunable number of the previous posted messages from all parties; (ii) in messages posted from all parties within an adjustable/tunable time period; and/or (iii) in messages posted by all parties since the author of the triggering message (participant2 in the first example) last sent a message (message two in the first example). In operation, some of these embodiments may first determine that adding "wool" at any location in the first message ("Did you meet the customer yesterday?") or the second message ("Yes we do.") would not form a semantically valid and/or more likely response. Next, some of these embodiments may determine that inserting the corrective content of message four ("wool") into message three ("Yes, they want cotton and socks for their shop.") would make a semantically valid and more likely message between "and" and "socks". In particular, these embodiments may determine that the modified version of the third message would be more semantically likely (i.e. have a higher semantic correctness score) than the original version of message three.

With continuing reference to the first illustrative example, some embodiments may include an analysis engine that tries to determine if the author of the fourth message (participant2, who sent "wool") intended that that message be integrated into one of the previous messages. In some embodiments, this may include calculating a semantic correctness score by a semantic analysis routine that is indicative of whether or not the first, second, and/or third messages would make sense and/or make more sense with "wool" replacing all of the available words and/or if located in all the available placeholders and/or if appended/prepended to all of the available words. For example, "wool Did you meet the customer yesterday?" will be rated as having a low correctness score (adjective not proximate a noun).

"Did wool you meet the customer yesterday?" will be rated as having a low correctness score (this would have a slightly higher semantic correctness score because the adjective is proximate a noun—however, the fact that individuals are normally not associated with a cloth-type adjective keeps the semantic correctness score low).

. . .

"wool Yes we do." will be rated as having a low correctness score.

"Yes wool we do." will be rated as having a low correctness score.

. . .

"Yes, they want cotton wool and socks for their shop." will be rated as a low correctness score "Yes, they want cotton and wool socks for their shop." will be rated as a high correctness score (the adjective is proximate a noun, and socks are normally associated with a cloth-type adjective).

. . .

"WoolDid you meet the customer yesterday?" would be rated as a low correctness score.

"Didwool you meet the customer yesterday?" would be rated as a low correctness score.

. . .

"Yes, they want cotton and wool for their shop." will be rated as a medium correctness score "Yes, they want cotton and socks wool their shop." will be rated as a low correctness score

. . .

In this first illustrative example, because the content of the fourth message ("wool") alone did not appear to be a valid message or response, and because the content of that message can be combined with one the previous messages to form a proposed corrected message with a higher correctness score than the original message, some embodiments may conclude that the sender of message four wanted to edit message three to read "Yes, they want cotton and wool socks for their shop."

Next, based on the above analysis, some embodiments may, in a messaging interface associated with the original sender of the third message (i.e., participant1 in the first illustrative example), present an indication that participant2 wishes to edit their third message to say "Yes, they want cotton and wool socks for their shop." If participant1 accepts this edit, some embodiments may: (i) post the edited third message, and (ii) not post "wool" as a separate message 4. One advantage of these embodiments is that, if message four is posted and the edit accepted quickly, participant0 in the first illustrative example may only see:

participant0: Did you meet the customer yesterday?
participant2: Yes we do.
participant1: Yes, they want cotton and wool socks for their shop. (*)

In some embodiments, the asterisk (*) in this illustrative example may be presented to highlight the fact that the third message was edited and/or had a proposed edit—but any other type of notifying indicia may be used as well. In some embodiments, hovering or selecting the asterisk (*) may allow that participant to view additional information about the edit, such as: the original text, the proposed edit, which participant proposed the change, when the change occurred (i.e., a timestamp), and whether or not the original author explicitly approved the change.

In some embodiments, the system may automatically, and without additional action from the original sender, update the third message with the new, corrected, message after a certain amount of time. Some of these embodiments may also indicate that the edit was not accepted by the original author. Additionally, some embodiments may allow for the original sender to retroactively overrule the correction at a later time. These embodiments may then revert the edited third message and the fourth message to their original content. Some of these embodiments may further indicate that a correction was rejected by the original author, together with the relevant time stamps.

As a second illustrative example:
participant0: Did you meet the customer yesterday?
participant2: Yes we do.
participant1: Yes, they want to buy a new trek
participant2: u Some embodiments may analyze the first message in this second illustrative example ("Did you meet the customer yesterday?"), the second message ("Yes we do."), and the third message ("Yes, they want to buy a new trek") as semantically valid sentences or responses, and thus, not trigger any events. Those embodiments may then analyze message four ("u"). Because message four is not a valid sentence nor a response to an earlier message from another participant, some embodiments may trigger an event based on message four. This event may be analyzed by the analysis engine to determine if the message "u" could be combined with any words in the first, second, or third messages. To do that, some embodiments calculate a semantic correctness score indicative of whether or not the first, second, or third messages would make more sense with "u" in all of the candidate locations (e.g., between every two letters of a word) and with "u" appended/prepended to all of the available words. In this second illustrative example, some embodiments may conclude that participant2 wanted to edit the third message to say "Yes, they want to buy a new truck." Moreover, in these embodiments, if participant2 posted message four ("u") quickly and that proposed edit was accepted quickly, participant0 may see in their graphical messaging application:

participant0: Did you meet the customer yesterday?
participant2: Yes we do.
participant1: Yes, they want to buy a new truck (*)

Two additional scenarios may be addressed by some embodiments. First, if one of the other participants (e.g., participant0 in illustrative example two) in the conversation other than the original "sending" participant and the "correcting" participant has already read the uncorrected message, some embodiments may only edit the message in that participant's graphical messaging application and highlight the correction. That is, some embodiments may still display the correction message in this scenario to avoid confusing that participant. Second, if yet another one of the other participants have not read the "incorrect" message, then some embodiments may replace the incorrect message with the corrected message such that that receiver may not be even aware that the message was modified. That is, different participants may see different chat histories in their associated messaging applications in some embodiments. In both scenarios, however, both types of participants may see the message flagged or marked as "modified" in some embodiments.

One feature and advantage of some embodiments is that they only require minimal interaction from the correcting participant. For example, the correcting participant does not need to select an "edit" function to fix the message or remember any obscure editing commands. Instead, everything is done in-line using natural language. Some embodiments may facilitate this feature through tuning, such that these embodiments only trigger the confirmation dialogues and/or actually modify messages when the "correcting" participant's intent is clear. Ambiguous messages cases in these embodiments can be passed on and read normally. In this way, some embodiments may offer the capability for anyone to fix or append someone else's message by merely posting a natural language message. In these embodiments, each time a participant posts a message in a conversation, the analysis engine may determine if the message should be interpreted as a normal message or should be processed as a "fix/append" message.

Another feature and advantage of some embodiments may be increased efficacy versus dictionary-based correction methods. For example, while a dictionary-based system may be able to fix a misspelling or other typographical error, a dictionary-based system cannot detect that a key word, phrase, or punctuation (such as an adjective, a color, a description, the world "not," etc.) is missing. Moreover, a dictionary-based system often cannot determine that a participant wishes to replace a correctly spelled word with another correctly spelled word. Nor can a dictionary resolve ambiguous language. For example, the phrase, "I can assure you that no person would be better for the job", may be taken to mean that the candidate is stellar or that the candidate is abysmal.

Yet another feature and advantage of some embodiments is that they can be added into existing messaging solutions as a plugin or the like.

The aforementioned advantages are example advantages, and not all advantages are discussed. Furthermore, embodiments of the present disclosure can exist that contain all, some, or none of the aforementioned advantages while remaining within the spirit and scope of the present disclosure.

Cloud Computing

FIG. 1 illustrates an embodiment of a cloud environment. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active participant accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited participant-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain 3 resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
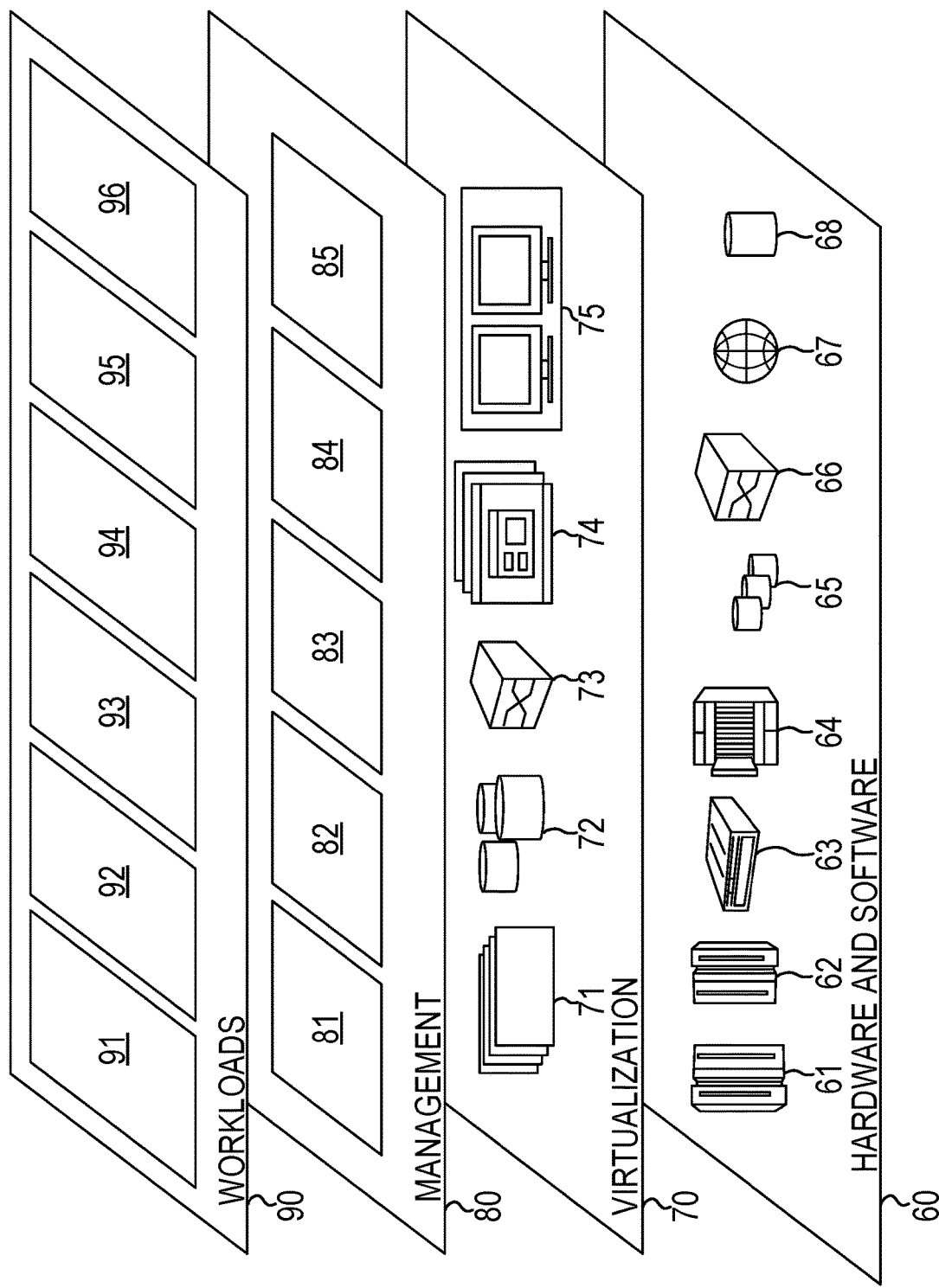
FIG. 2 depicts abstraction model layers, in accordance with some embodiments.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. Participant portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and messaging system 96.

Data Processing System

Figure 3:
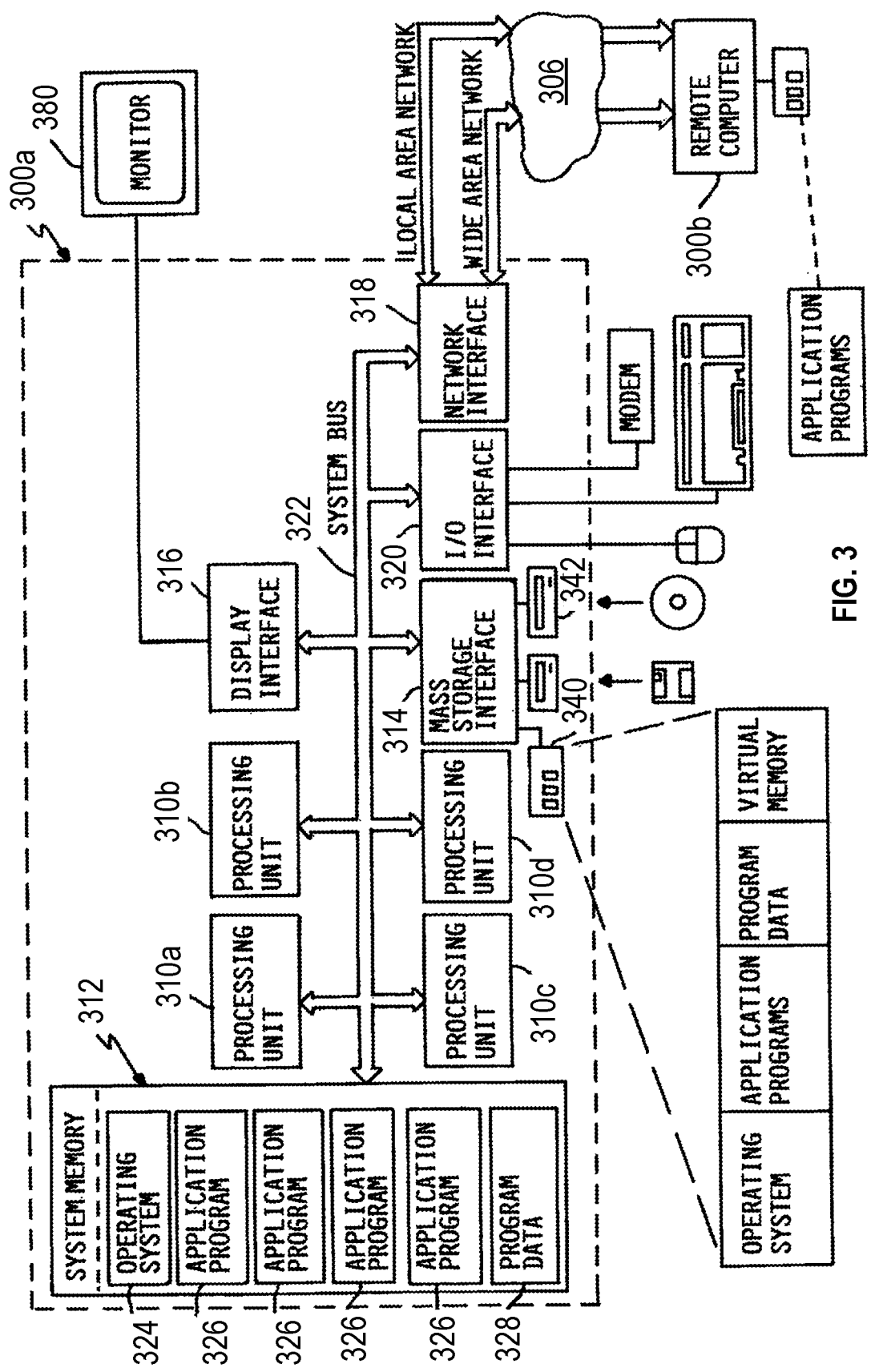
FIG. 3 depicts a data processing system, in accordance with some embodiments.

FIG. 3 illustrates an embodiment of a data processing system (DPS) 300 suitable for use in a cloud environment (such as cloud environment 50), consistent with some embodiments. In some embodiments, the DPS 300 is implemented as a personal computer; server computer; portable computer, such as a laptop or notebook computer, PDA (Personal Digital Assistant), tablet computer, or smart phone; processors embedded into a larger devices, such as an automobile, airplane, teleconferencing system, appliance; smart devices; or any other appropriate type of electronic device. Moreover, components other than or in addition to those shown in FIG. 3 may be present, and that the number, type, and configuration of such components may vary. Moreover, FIG. 3 only depicts the representative major components of the DPS 300, and individual components may have greater complexity than represented in FIG. 3.

The data processing system 300 in FIG. 3 comprises a plurality of central processing units 310 $a$-310 $d$ (herein generically referred to as a processor 310 or a CPU 310) connected to a memory 312, a mass storage interface 314, a terminal/display interface 316, a network interface 318, and an input/output ("I/O") interface 320 by a system bus 322. The mass storage interface 314 in this embodiment connect the system bus 322 to one or more mass storage devices, such as a direct access storage device 340 or a readable/writable optical disk drive 342. The network interfaces 318 allow the DPS 300 to communicate with other DPS 300 over the communications medium 306. The memory 312 also contains an operating system 324, a plurality of application programs 326, and program data 328.

The data processing system 300 embodiment in FIG. 3 is a general-purpose computing device. Accordingly, the processors 310 may be any device capable of executing program instructions stored in the memory 312 and may themselves be constructed from one or more microprocessors and/or integrated circuits. In this embodiment, the DPS 300 contains multiple processors and/or processing cores, as is typical of larger, more capable computer systems; however, in other embodiments the computing systems 300 may comprise a single processor system and/or a single processor designed to emulate a multiprocessor system. Further, the processors 310 may be implemented using a number of heterogeneous data processing systems 300 in which a main processor is present with secondary processors on a single chip. As another illustrative example, the processor 310 may be a symmetric multi-processor system containing multiple processors of the same type.

When the data processing system 300 starts up, the associated processor(s) 310 initially execute the program instructions that make up the operating system 324, which manages the physical and logical resources of the DPS 300. These resources include the memory 312, the mass storage interface 314, the terminal/display interface 316, the network interface 318, and the system bus 322. As with the processor(s) 310, some DPS 300 embodiments may utilize multiple system interfaces 314, 316, 318, 320, and system busses 322, which in turn, may each include their own separate, fully programmed microprocessors.

Instructions for the operating system, applications and/or programs (generically referred to as "program code," "computer usable program code," or "computer readable program code") may be initially located in the mass storage devices 340, 342, which are in communication with the processors 310 through the system bus 322. The program code in the different embodiments may be embodied on different physical or tangible computer readable media, such as media for the removable readable/writable optical disk drive 342 or the mass storage device 340. In the illustrative example in FIG. 3, the instructions are stored in a functional form of persistent storage on the direct access storage device 340. These instructions are then loaded into the memory 312 for execution by the processor 310. However, the program code may also be located in a functional form on computer readable media that is selectively removable (e.g., readable/writable optical disk drive 342) and may be loaded onto or transferred to the DPS 300 for execution by the processor 310.

The system bus 322 may be any device that facilitates communication between and among the processors 310; the memory 312; and the interfaces 314, 316, 318, 320. Moreover, although the system bus 322 in this embodiment is a relatively simple, single bus structure that provides a direct communication path among the system bus 322, other bus structures are consistent with the present disclosure, including without limitation, point-to-point links in hierarchical, star or web configurations, multiple hierarchical buses, parallel and redundant paths, etc.

The memory 312 and the mass storage devices 340, 342 work cooperatively to store the operating system 324, the application programs 326, and the program data 328. In this embodiment, the memory 312 is a random-access semiconductor device capable of storing data and programs. Although FIG. 3 conceptually depicts that device as a single monolithic entity, the memory 312 in some embodiments may be a more complex arrangement, such as a hierarchy of caches and other memory devices. For example, the memory 312 may exist in multiple levels of caches, and these caches may be further divided by function, so that one cache holds instructions while another holds non-instruction data, which is used by the processor or processors. Memory 312 may be further distributed and associated with different processors 310 or sets of processors 310, as is known in any of various so-called non-uniform memory access (NUMA) computer architectures. Moreover, some embodiments may utilize virtual addressing mechanisms that allow the DPS 300 to behave as if it has access to a large, single storage entity instead of access to multiple, smaller storage entities such as the memory 312 and the mass storage device 340, 342.

Although the operating system 324, the application programs 326, and the program data 328 are illustrated as being contained within the memory 312, some or all of them may be physically located on different computer systems and may be accessed remotely, e.g., via the communications medium 306, in some embodiments. Thus, while the operating system 324, the application programs 326, and the program data 328 are illustrated as being contained within the memory 312, these elements are not necessarily all completely contained in the same physical device at the same time and may even reside in the virtual memory of other DPS 300.

The system interface units 314, 316, 318, 320 support communication with a variety of storage and I/O devices. The mass storage interface 314 supports the attachment of one or more mass storage devices 340, 342, which are typically rotating magnetic disk drive storage devices, a solid-state storage device (SSD) that uses integrated circuit assemblies as memory to store data persistently, typically using flash memory, or a combination of the two. However, the mass storage devices 340, 342 may also comprise other devices, including arrays of disk drives configured to appear as a single large storage device to a host (commonly called RAID arrays) and/or archival storage media, such as hard disk drives, tape (e.g., mini-DV), writeable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like.

The terminal/display interface 316 is used to directly connect one or more display units 380, such as a LED monitor, to the data processing system 300. These display units 380 may be non-intelligent (i.e., dumb) terminals, such as an LED monitor, or may themselves be fully programmable workstations used to allow IT administrators and participants to communicate with the DPS 300. Note, however, that while the display interface 316 is provided to support communication with one or more display units 380, the computer systems 300 does not necessarily require a display unit 380 because all needed interaction with participants and other processes may occur via network interface 318.

The communications medium 306 may be any suitable network or combination of networks and may support any appropriate protocol suitable for communication of data and/or code to/from multiple DPS 300. Accordingly, the network interfaces 318 can be any device that facilitates such communication, regardless of whether the network connection is made using present day analog and/or digital techniques or via some networking mechanism of the future. Suitable communication media 306 include, but are not limited to, networks implemented using one or more of the "Infiniband" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols can be used to implement the communications medium 306. The Transmission Control Protocol/Internet Protocol ("TCP/IP") suite contains suitable network and transport protocols.

Semantic Message Correction

Figure 4:
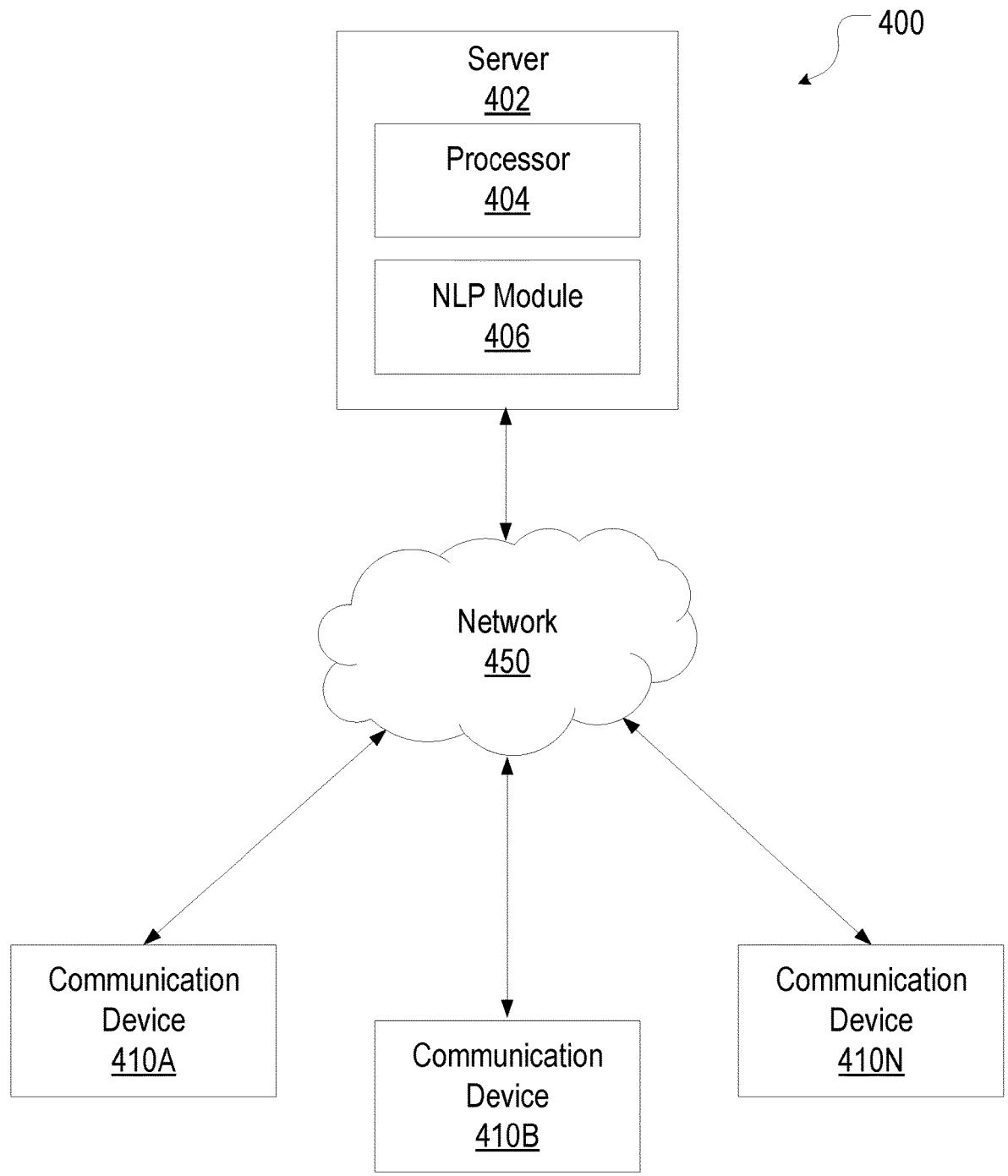
FIG. 4 illustrates a block diagram of a semantic message correction system, in accordance with some embodiments.

FIG. 4 shows a block diagram of a server-based semantic message correction system 400, in accordance with some embodiments. In the illustrated embodiment, the semantic message correction system 400 includes a server Data Processing System (DPS) 402 and a plurality of client DPS 410A, 410B, . . . 410N (collectively referred to client DPS 410) that are communicatively coupled via a network 450.

The network 450 may be any type of communication network, such as a telecommunications network or the cloud computing environment 50 described with reference to FIGS. 1 and 2, a wide area network (WAN), a local area network (LAN), and/or the Internet. The network 450 can be implemented using any type and number of communications media, such as hardwire connections (e.g., an Ethernet cable) and/or wireless communication networks (e.g., wireless router, telecommunication network, etc.). In some embodiments, the various systems may be communicatively coupled using a combination of one or more networks and/or one or more local connections. For example, the server DPS 402 may communicate with client DPS 410A using a hardwired connection, while communication between the server DPS 402 and client DPS 410N may be through a wireless communication network (e.g., telecommunications network).

The server DPS 402 may be any device or combination of devices configured to store, send, and receive electronic communications (e.g., messages) to and/or from the client DPS 410. In some embodiments, the server DPS 402 embodiments may be a computer system substantially similar to the DPS 300 described with reference to FIG. 3. In other embodiments, the server DPS 402 may be a cellular tower or base station that receives messages from client DPS 410A and forwards the received messages to the client DPS 410B over a control channel.

In the illustrated embodiment, server DPS 402 includes a processor 404 and a natural language processing (NLP) module 406. The NLP module 406 in some embodiments can analyze messages sent and/or received from one or more participants to discern the meaning of those messages, and thus, recognize an intent to correct errors and/or make corrections within the message stream. For example, if a correcting participant corrects an error in a first message (e.g., by sending a subsequent, second message containing a desired modification), the NLP module 406 may first determine that the subsequent, second message contains a desired modification, then determine the most likely location for the desired modification (e.g., in which message and where in that message), and then make the desired modification. As part of this analysis, the NLP module 406 may analyze both messages for context, semantics, grammar, and spelling to determine the appropriate corrective action for the text.

In some embodiments, the server DPS 402 may also use additional machine learning modules (e.g., artificial neural networks) to learn from various corrections previously provided by the participant(s), the participants writing styles, and the participants' topics of interest. For example, these other machine learning modules may analyze historical message patterns entered by the participant(s) for correcting various sentence structures and/or commonly correction markers to better identify messages containing desired modifications and to properly implement those changes.

The client DPSs 410 may be any type of device configured to send and/or receive messages. Some client DPS 410 embodiments may be substantially similar to the DPS 300 described with reference to FIG. 3, while other client DPS 410 embodiments may be a mobile devices (e.g., a smart phone, tablet, etc.), a smart home speaker, smart television/remote, a driver information center in an automobile, etc. Client DPS 410 may include a participant user interface allowing that participant to send and receive messages sent to and from other participants. For example, a smart phone client DPS 410A may have a texting application in which the participant may type, send, and receive text messages to client DPS 410B. Similarly, a smart speaker client DPS 410N may have a speech-to-text interface in which a participant can dictate messages to another client DPS 410A.

FIG. 4 depicts the representative major components of the semantic message correction system 400. In some embodiments, however, individual components may have greater or lesser complexity than as represented, components other than or in addition to those shown may be present, and the number, type, and configuration of such components may vary. Likewise, one or more components shown with the system 400 may not be present, and the arrangement of components may vary. For example, while FIG. 4 illustrates an example semantic message correction system 400 having a single server DPS 402, three client DPS 410, and one network 450, suitable network architectures for implementing embodiments of this disclosure may include any number of servers, communication devices, and networks. The various models, modules, systems, and components illustrated in FIG. 4 may exist, if at all, across a plurality of media playback devices, cognitive state determination devices, and databases.

Figure 5A:
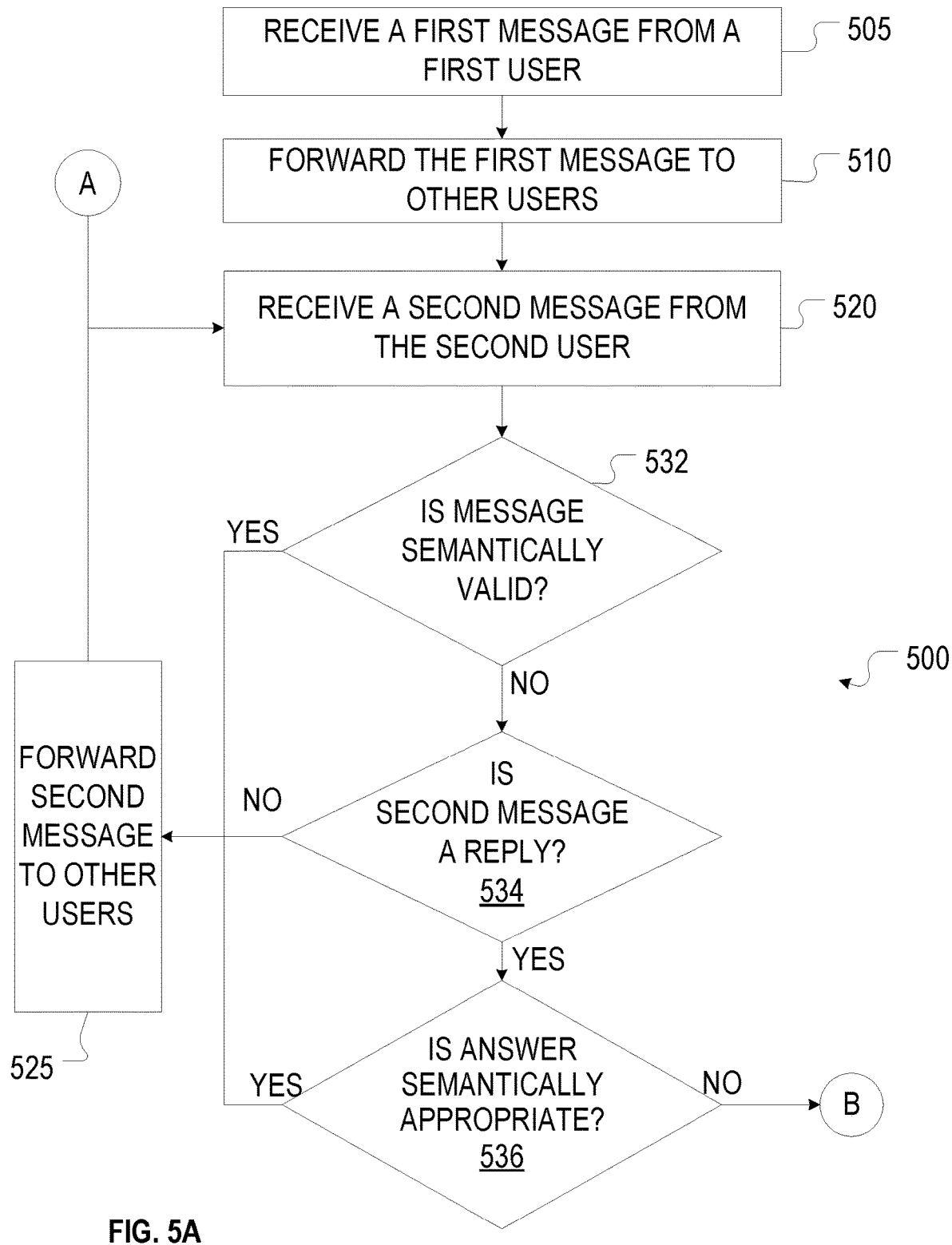
FIGS. 5A and 5B (collectively FIG. 5) illustrate a flow diagram of an example process for correcting a sent message, in accordance with some embodiments.
Figure 5B:
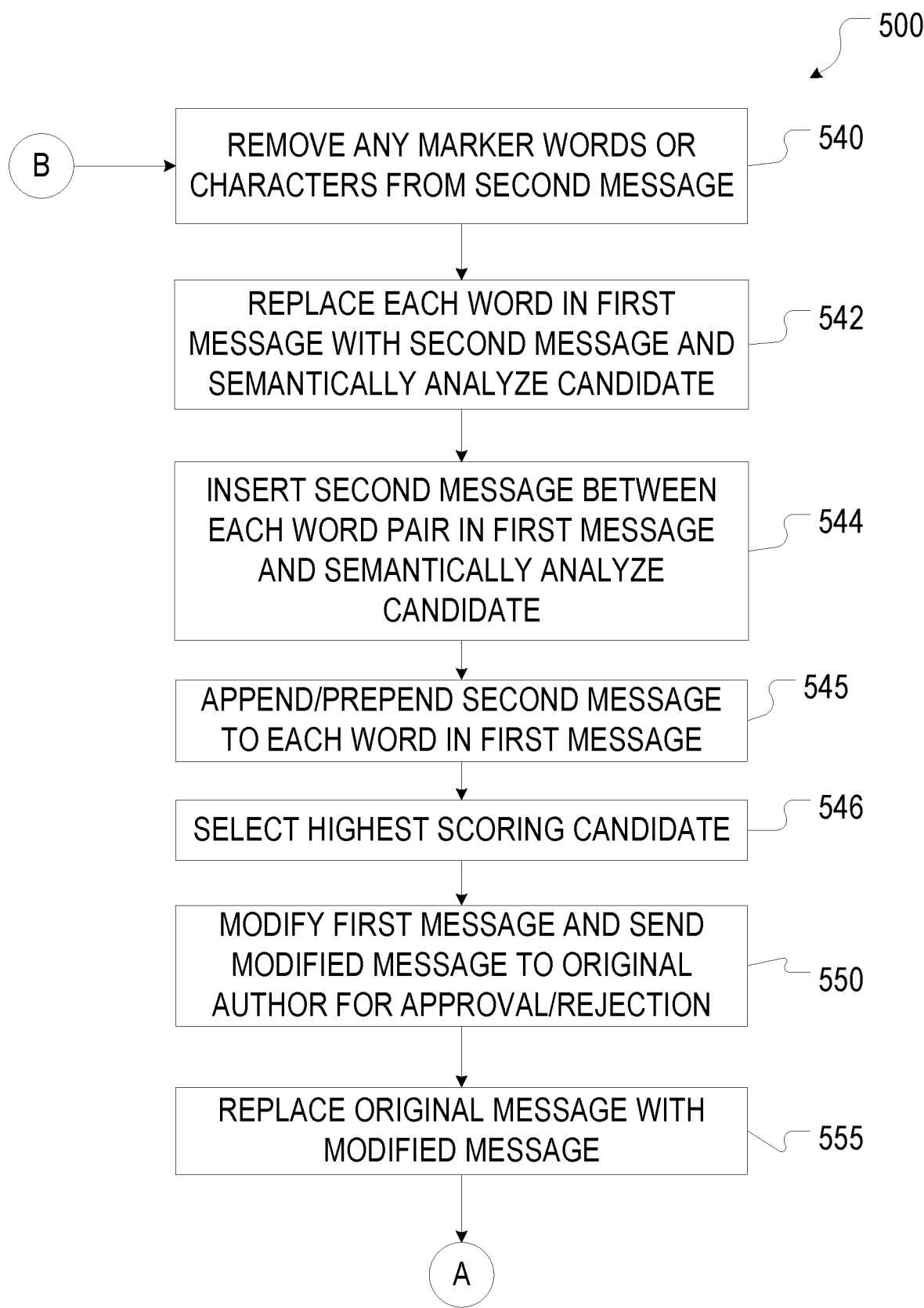

Referring now to FIGS. 5A-5B, shown is a flow diagram of an example process 500 for correcting a previously sent message, in accordance with some embodiments. The process 500 may be performed by processor 404 in FIG. 4, or by one or more of the client devices 410A-410N in FIG. 4. In some embodiments, the processing may be split across the server DPS processor 404 or processors in the client devices 410.

The process 500 begins by receiving a first message sent by a first, "sending" participant in a group chat. This is illustrated at operation 505. For example, the first participant may send the first message from their smartphone to be read by one or more participants in the group chat session on their smartphone(s). In embodiments, the first message is received at the server DPS 402, such as a server-side of a client-server messaging application, a server-hosted messaging application, and/or a cellular tower. The process 500 may continue by forwarding the first message to one or more other participants in the group chat. This is illustrated by operation 510. For example, once the server DPS 402 receives the first message from the sending participant, the server DPS 402 may simultaneously forward the first message to a messaging application of the other participant(s). In other embodiments, the server DPS 402 (e.g., via a web-based server) may post the first message into a persistent or semi-persistent group chat session, such as an IRC channel, web-based instant messaging platform, etc., from which the other participant(s) can access its content.

At operation 520, a "correcting" participant determines that the first message contains an error and/or ambiguity (e.g., a poor word choice, an incorrect word, a misspelled word, a missing word, a repeated word, etc.) To correct the error and/or ambiguity, the correcting participant types and sends a second, follow-up message containing a desired modification e.g., an additional word(s) or a phrase to be appended, the correct word for replacement, the correct spelling, etc. For example, if the correcting participant realizes a first message from the sending participant stating, "Can you please send me your assessment" is ambiguous, the correcting participant may send a second message containing the word "tax."

The process may continue at operations 532, 534, and 536, where the second message is analyzed to determine whether it is a valid sentence, a response to a previous question, and/or a semantically appropriate answer, respectively. In some embodiments, the system first determines at operation 532 whether or not the second message has a valid grammar. One suitable method is to first parse the sentence using a context-free parser. If the second message parses, then it is evaluated to be a valid sentence. If the second message does not parse, then it is evaluated to be invalid sentence. Another suitable method is to use a wide-coverage parser, such as the Stanford parser, to perform this evaluation.

A second message that appears to form one or more valid sentences is sent to the other participant(s) at operation 525. A second message that does not appear to form valid sentences is then analyzed to determine if it is responsive to an earlier question from another participant. One suitable method is to first determine at operation 534 whether one of the recent messages received by the correcting participant (i.e., from another participant) contains an inquiry. Some embodiments may evaluate operation 534 by performing a syntactic parse of the earlier received message(s) to determine if any tree with an SBARQ node has an embedded SQ node. If the earlier received message(s) is an inquiry, then some embodiments may then determine at operation 536 whether the second message represents a semantically appropriate answer to that inquiry using NLP techniques. For example, if the earlier received message asked "what time are you available," then "2:00" would be a semantically appropriate answer, whereas "no" would not be a semantically appropriate answer. Some embodiments may consider a variety of factors in making this determination, including without limitation, verb-noun agreement, statistical likelihood of correlations between adjectives-nouns adverbs-verbs (e.g., a "cotton human" is a statistically unlikely word pair and would lower the score, whereas a "cotton shirt" is a statistically likely word pair and would raise the score), spelling mistakes made in the sentence, other numerical/formal mistakes (e.g., dates like "32th March 2020" would lower the score), etc.

Some embodiments may further tune one or more of the tests used in operations 532, 534 and 536 to be biased away from false positive errors i.e., these embodiments may only flag the second message for additional processing if the second message is clearly invalid and/or clearly a semantically valid response. In this way, these embodiments may provide protection against erroneous confirmation dialogues (see FIGS. 6A-6B) and/or corrections. Some embodiments may also analyze the second message(s) against tunable number of the previous posted messages, against messages received within the last tunable amount of time, and/or against messages received since the author of the triggering message last sent a message in some embodiments, as opposed to just the most recent message. These embodiments may be desirable when multiple participants in a conversation are simultaneously sending and receiving messages.

The process 500 may continue at operation 540 on FIG. 5B, where the system may parse the second message to identify and remove any common marker words or characters indicating or associated with a correction or modification e.g., "you mean, [X]" "LOL, [X]" "no, [X]," "+[X]," "[X]*," and the like. In some embodiments, these marker words or characters may be used by the models to increase the semantic scores of all of the replacement candidates. That is, the common marker words or characters may serve as evidence that a correction was intended. In some embodiments, these marker words or characters may be part of a predefined list. In other embodiments, the list of marker words or characters may be dynamically updated based on the participant's and/or participants' writing patterns.

Next, at operations 542, 544, 545, and 546, the system may determine a location to make the desired modification of the first message. At operation 542, the processor may first replace each word in the first message with the desired modification from the second message, and then semantically analyze the result using the NLP module 406 to calculate a semantic correctness score (e.g., a value that correlates with how well the candidate message complies with the generally accepted grammar rules for a selected human language) for the resulting candidate messages. Some embodiments may consider a variety of factors in making this determination, including without limitation, verb-noun agreement, statistical likelihood of correlations between adjectives-nouns adverbs-verbs (e.g., a "cotton human" is a statistically unlikely word pair and would lower the score, whereas a "cotton shirt" is a statistically likely word pair and would raise the score), spelling mistakes made in the sentence, other numerical/formal mistakes (e.g., dates like "32th March 2020" would lower the score), etc.

Next, at operation 544, the processor may insert the desired modification between every pair of worlds in the first message, and then may semantically analyze the result using the NLP module 406 to calculate a semantic correctness score for each of the resulting candidate messages. At operation 545, the processor may append and prepend the desired modification to every word in the first message, and then semantically analyze the result using the NLP module 406 to calculate a semantic correctness score for each of the resulting candidate messages. At operation 546, the processor may sort the candidate messages by semantic correctness score and may select the highest candidate to be the modified/corrected version of the first message. In some embodiments, the processor may create the modified/corrected version of the first message if the semantic correctness score for the highest candidate location is significantly greater than the semantic correctness score for the next-highest candidate location and/or for the original second message. In some embodiments, the processor may also require that the semantic correctness score be greater than some tunable threshold.

For example, in the first illustrative example above, some embodiments test if first, second, and third messages would make logical sense with "wool" located in all the available placeholders, e.g., "wool Did you meet the customer yesterday?" will be rated as having a low correctness score.

"Did wool you meet the customer yesterday?" will be rated as having a low correctness score.

. . .

"wool Yes we do." will be rated as having a low correctness score.

"Yes wool we do." will be rated as having a low correctness score.

. . .

"Yes, they want cotton wool and socks for their shop." will be rated as a low correctness score "Yes, they want cotton and wool socks for their shop." will be rated as a high correctness score.

. . .

"WoolDid you meet the customer yesterday?" would be rated as a low correctness score.

"Didwool you meet the customer yesterday?" would be rated as a low correctness score.

. . .

"Yes, they want cotton and wool for their shop." will be rated as a medium correctness score "Yes, they want cotton and socks wool their shop." will be rated as a low correctness score

. . .

If the desired modification was an individual letter replacement, a spelling dictionary may also be used to identify candidate words into which the replacement letter may be inserted. If there are multiple valid candidate words (e.g., in some conversations, a "s" could be added to multiple words), then some embodiments may identify the most likely candidate using the resulting semantic correctness scores, as described above.

The process 500 may continue by automatically making the desired modification in the first message, which may then be presented to the original author for approval or rejection. This is illustrated at operation 550. As will be explained in more detail with reference to FIGS. 6-9, once the proper location for the change is determined, the processor may automatically insert the missing word into the sentence from the first message. For example, returning to the "Can you please send me your assessment" example, the processor may insert the word "tax" to produce the modified/corrected version of the first message as "Can you please send me your tax assessment." If the original author of the first message (i.e., the sending participant) approves the modified/corrected version of the first message, the process 500 may continue by replacing the original version of the first message with the modified/corrected version in the user interface(s) of other participants in the group chat, and then may return to operation 520 on FIG. 5A.

Figure 6A:
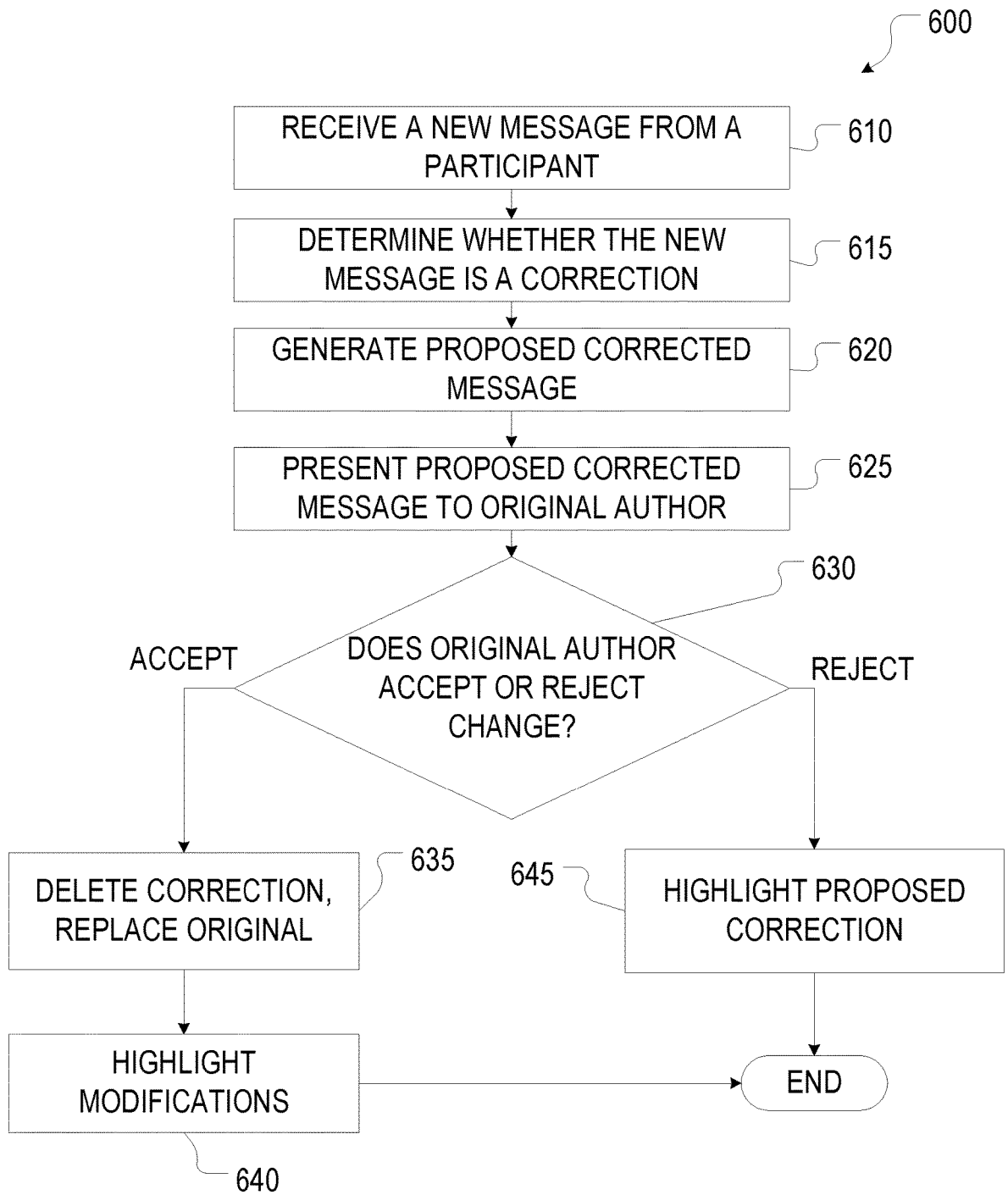
FIG. 6A shows a flow diagram for an example process for presenting a corrected version of a message to the original sender of that message for approval or rejection, in accordance with some embodiments.

FIG. 6A shows a flow diagram for an example process 600 for presenting a modified/corrected version of the first message to the original author of that message (i.e., the sending participant) for approval or rejection. In some embodiments, the process 600 is a computer-implemented process, performed by the processor 404 in FIG. 4, or by one or more of the client devices 410A-410N in FIG. 4.

Process 600 may begin at operation 610 by receiving a new, "second" message from one of the "other" participants in a group chat. At operation 615, the process then determines that the sender of the second message intended for that message to be a correction to an earlier, original "first" message created and sent by the "sending" participant. At operation 620, the process may then generate a proposed modified/corrected version of the original first message. In some embodiments, operations 610, 615, and 620 may be performed by the processing logic described with reference to FIGS. 5A and 5B.

At operation 625, the process 600 may then forward the proposed corrected/modified message to the individual who authored the original version of that message for display in their instant messaging client. The process may continue at 630 by presenting an "accept change" or "reject change" input panel with, e.g., radial selection buttons to the original author, and then receiving input from that original author. If the original author of the first message accepts the change, then some embodiments may send control signals at operation 635 to direct the other participants' message client(s) to both delete the second, "correction" message and to replace the first message with the corrected/modified version. In some embodiments, multiple proposed corrected messages may be presented to the original author, and the author may select from one of them, or select "none of the above", using known selection techniques.

In some embodiments, the other message clients may also indicate that what was changed, who made the change, when the change occurred, and when the original author accepted the change at operation 640. If the original author of the first message rejects the change, then some embodiments may end, leaving the original first message and the second message displayed in the message clients of the other participants. Other embodiments may optionally send control signs to direct the other participants' message client(s) to highlight the second message as a point of possible disagreement between the participants, but without correcting the first message, at operation 645. This may be indicated by displaying the second message in a different color or font, as well as displaying an asterisk or other icon or indicator indicating that the original author rejected the proposed change.

In some embodiments, the control signals may comprise text flowing in the same communications channel, but with special designations that some of that text is to be used for control message rather than as a message to be displayed. One suitable such designation may be to define an eXtensible Markup Language (XML) syntax for the communication that allows some elements to be tagged for immediate display and other elements to be tagged as containing edits, potential edits, approve/rejection notices, timestamps, etc. Logic built into each of the participant interfaces 701 may then interpret those tags to implement one or more of the displays described with reference to FIGS. 7A, 7B, 8A, 8B, 9A, and 9B. In other embodiments, these control signals may comprise an application programming interface (API), or the like, which allow for more direct control of the participant interfaces 701. Still other embodiments may use a combination of markup languages and APIs to coordinate among the participant interfaces.

Figure 6B:
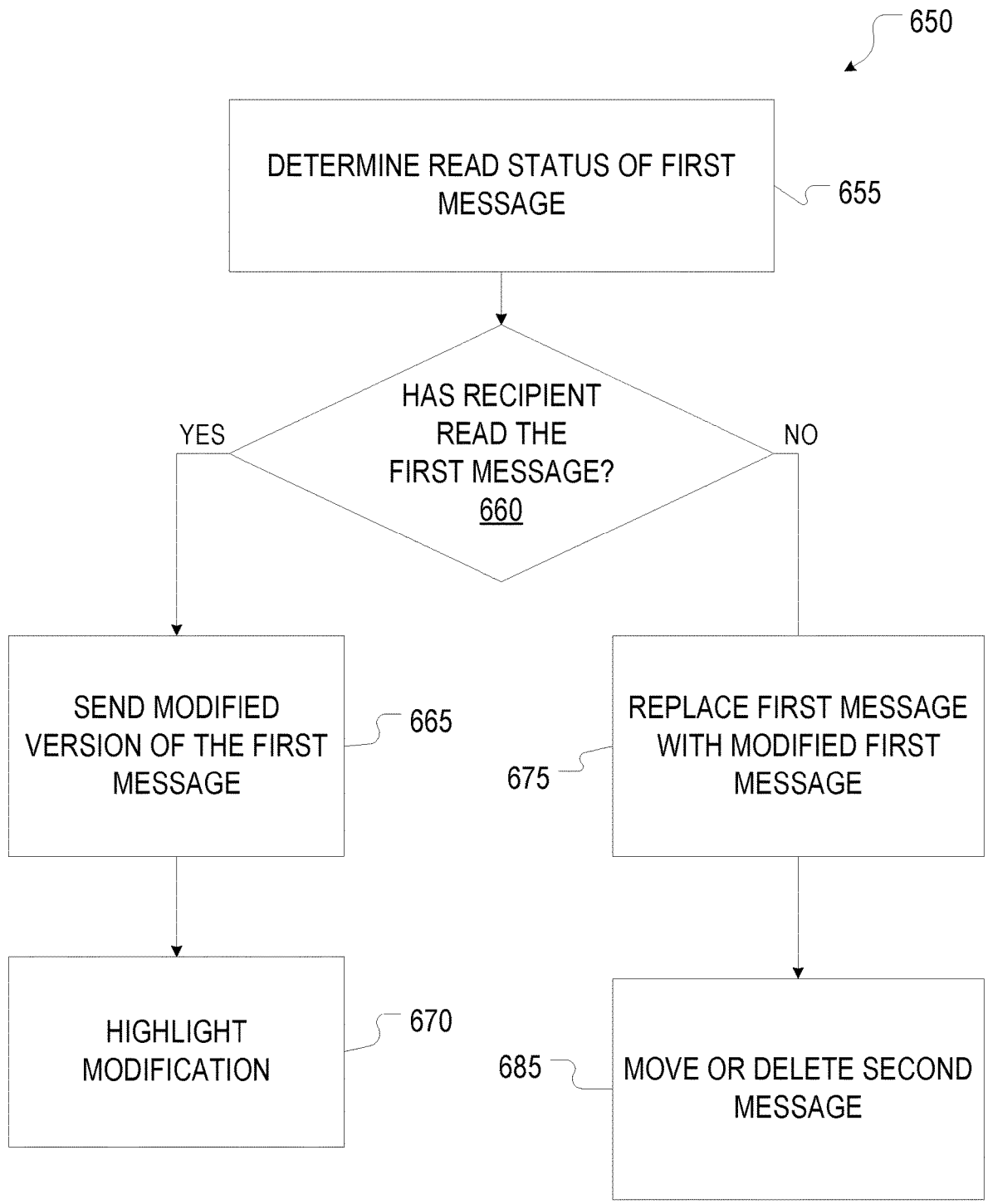
FIG. 6B shows a flow diagram for an example process for sending a corrected version of a message based on read status, in accordance with embodiments.

FIG. 6B shows a flow diagram for an example process 650 for sending a corrected version of the first message based on read status to participants other than the sending participant or the correcting participant, in accordance with embodiments. Process 650 may be in addition to or a subset of process 500. In some embodiments, the process 650 may be performed by the processor 404 in FIG. 4, or by one or more of the client devices 410A-410N in FIG. 4.

The process 650 begins by determining the read status of the first message (e.g., the message containing an error) for each recipient of the message. This is illustrated at operations 655-660. If the first message has not been read by a particular one of the recipients, the process 650 continues by sending control messages, such as those described above, directing that recipient's messaging client to replace the first message with the corrected/modified version of that message. This is illustrated at operation 675. For example, if the first message is "I like socks" and the second message is "cotton," the first message may be replaced on recipient's participant interface with a modified/corrected version of the first message, e.g., "I like cotton socks," if the recipient has not read the original first message. In this way, that particular recipient of the message(s) never sees the first (i.e., incorrect) version of the message. In some embodiments, the system may also move the second message to a different panel, or even delete it, at operation 685.

If the first message has been read by a particular one of the other recipients, the process 650 continues by highlighting the correction in the sent modified/corrected version of the first message. This is illustrated at operation 665. For example, the processor may determine the first message containing the error was read by the recipient. Because that particular recipient read the message, the processor may forward the modified/corrected version of the first message for display in the recipient's messaging client, in addition to the original first message. The system may indicate what was changed, as depicted in operation 670. In some embodiments, the indication may take the form of a highlighted portion where the correction was made. For example, the corrected version of "I like cotton socks" may be shown on the recipient's participant interface with the word "cotton" highlighted. In some embodiments, the system may send an additional control message directing the message client(s) belonging to the other recipient(s) to display a special icon, indicator, or the like to indicate the message was modified. In some embodiments, the system may provide ask the recipient's permission to modify the first message. For example, a notification may state, "another participant wants to modify the first message." In some embodiments, the system may send a description of the change as a notification or as metadata. For example, a notification may state, "the original text message was missing the word 'cotton.'"

Referring now to FIGS. 7A-7B, 8A-8B and 9A-9B, shown are a set of graphical interfaces in messaging clients belonging, respectively, to a sending participant, a correcting participant, and the other participants of a string of messages in a conversation. FIG. 7A illustrates some example displays that may result from executing a method for correcting an unread message, such as processes 500 and 600 discussed above, in accordance with some embodiments. In the illustrated embodiment, a first participant interface 701A is shown for the sending participant, a second participant interface 701B is shown for the correcting participant in the group chat session, and a third participant interface 701C is shown for the other participants in the group chat session.

In one embodiment, a sending participant types a first message as "I bought socks today" in the first participant interface 701A and sends the first message (i.e., SMS1) to the other participants to be displayed via their participant interface 701B, 701C. The correcting participant notices there is a missing word in the first message SMS1 and wants to include the word "cotton" in the message. To correct the first message SMS1, the correcting participant creates and sends a second message (i.e., SMS2) containing the missing word (e.g., "cotton"), the missing word with a fragment of the original message (e.g., "cotton socks"), the missing word together with human-readable marker word commonly associated with corrections (e.g., "Oops, boots"), or similar human-readable construction. In embodiments, the desired modification may comprise more than one world or even a phrase. For example, the correcting participant may type "at the mall" and the processor may determine that the phrase should be added at the end of the sentence of first message (e.g., "I bought socks today at the mall"). In some embodiments, no special editing commands or special editing-related formatting or character sequences are required. Instead, the correcting participant can compose the same second message they would if the semantic message correction system 400 (see FIG. 4) were not present or operating.

Once the second message is sent, the system may first identify it as a desired correction, determine to which message it applies, and determine the proper location of the additional word or phrase, as described in more detail with reference to FIG. 5. The system may then ask the original sender of that message to accept or reject the proposed edit. If the edit is accepted and if a particular recipient has not read the first message, the system may send control signals directing their participant interface 701C to automatically replace the first message (i.e., SMS1) with the corrected version of the message (i.e., SMS1$^1$).

FIG. 7B illustrates example displays that may result from executing one computer-implemented process for correcting a read message, such as processes 500 and 600 discussed above, in accordance with some embodiments. In the illustrated embodiment, the first participant interface 702A and the second participant interface 702B includes the same messages as 701A and 701B in FIG. 7A. However, in FIG. 7B, the system has determined that a particular other participant has read the first message on their participant interface 702C. In this instance, when the correcting participant sends the second message (e.g., SMS2) on their participant interface 702B with the word "cotton", the other participant receives a notification from the system that another participant proposed a change the previous message. The other participant then receives the modified/corrected version of the first message on their participant interface 702C. In some embodiments, the correction may be highlighted to show the other participant where the error was in the original message. For example, in the modified/corrected version of the first message, the word "cotton" is highlighted in the participant interface 702C to indicate that the word was added to the original message. In other embodiments, the correction may not be highlighted.

In some embodiments, even though the other person has seen the message, the original message may be modified, as illustrated in FIG. 7A, although this may require a modification to an existing messaging system, whereas the embodiment shown in FIG. 7B may work cooperatively with an existing messaging system. In these embodiments, the correction may be marked using standard text formatting (e.g., bold text, all capitols, etc.) so that the resulting message can be interpreted correctly by existing messaging clients. These embodiments may be desirable because those messaging clients may serve as a front-end to the system, which may reduce the amount of code that must be written for broad compatibility.

FIG. 8A illustrates example displays that may result from executing one computer-implemented process, such as processes 500 and 600 discussed above, for inserting a letter into a word in an unread message, in accordance with some embodiments. In the illustrated embodiment, a first participant interface 801A is shown for the sending participant, a second participant interface 801B is shown for a correcting participant, and a third participant interface 801C is shown for the other participants in the group chat. The sending participant types a first message (i.e., SMS1) in their interface 801A as "Please open the oor" and sends that message. The correcting participant notices there is a missing letter in the first message and wants to add the letter "d" to the word "oor" in that message. To correct the first message, the correcting participant creates and sends a second message (i.e., SMS2) containing the missing letter (e.g., "d"), the correct spelling (e.g., "door"), the correct spelling with a fragment of the original message (e.g., "the door"), the correct spelling together with human readable language commonly associated with corrections (e.g., "Oops, door"), or similar human readable construction. In some embodiments, no special editing commands or special editing-related formatting or character sequences are required. Instead, the correcting participant can compose the same second message they would if the semantic message correction system 400 (see FIG. 4) were not present or operating.

Once the second message is sent, the system may first identify that message as a desired correction, determine to which message the correction applies, and where the correction should be placed within that message. The system may then ask the sender of that message to accept or reject the proposed edit. If the edit is accepted and if a particular other participant has not read the first message, the system may send control signals directing the third participant interface 801C to automatically replace the first message (e.g., SMS1) with the corrected version of the message (e.g., SMS1$^1$). For example, the other participant may only see the corrected version of the message as "Please open the door" on the third participant interface 801C.

FIG. 8B illustrates example displays that may result from executing one computer-implemented process, such as processes 500 and 600 discussed above, for inserting a letter into a word in a read message, in accordance with some embodiments. In the illustrated embodiment, the sending and correcting participants create the same messages as described in FIG. 8A. However, in FIG. 8B, a particular other participant has read the first message on their participant interface 802C. When the correcting participant creates the second message, the other participant may receive a notification from the system on their third participant interface 802C that the correcting participant wishes to modify the first message. If the original, sending participant approves the change, the other participant then receives the corrected first message (e.g., SMS1$^1$) on their participant interface 802C. In some embodiments, the correction may be highlighted to show the second participant where the change was with respect to the original first message (e.g., SMS1). For example, "door" may be highlighted in the modified/corrected version of the first message on the third participant interface 802C. As with the word insertion described above, in some embodiments, even though the other person has seen the message, the original message may be modified, as illustrated in FIG. 8A, although this may require a modification to an existing messaging system, whereas the embodiment shown in FIG. 8B may work cooperatively with an existing messaging system. Moreover, the single letter addition illustrated in FIGS. 8A and 8B may be run sequentially with the word addition illustrated in FIGS. 7A and 7B, with the letter addition being run to determine the correct placement in a word, and then the corrected word being used in a subsequent word addition process, as described above.

FIG. 9A illustrates example displays that may result from executing one computer-implemented process, such as processes 500 and 600 discussed above, for substituting a word in an unread message, in accordance with some embodiments. In the illustrated embodiment, a first participant interface 901A is shown for the participant who sends the original message, a second participant interface 901B is shown for a correcting participant, and a third participant interface 901C is shown for another participant in the group chat. The sending participant initially types a first message (i.e., SMS1) as "I bought wool socks today" and sends that message to the other participants. A correcting participant notices the sender typed an incorrect word in first message and wants to replace the word "cotton" for the word "wool" in the first message. To correct the first message, the correcting participant types "wool," "wool socks," "LOL, wool," or the like into a second message (i.e., SMS2) in the second participant interface 901B. In some embodiments, no special editing commands or special editing-related formatting or character sequences are required. Instead, the correcting participant can compose the same second message they would if the semantic message correction system 400 (see FIG. 4) were not present or operating.

Once second message is sent, the system may first determine whether it is a correction, determine which message that correction applies, and determine where to make the correction, as described in more detail with reference to FIG. 5. If the original sending participant accepts the proposed change and a particular other participant has not read the first message on their third participant interface 902C, the system may automatically replace the first message (e.g., SMS1) with the corrected message (e.g., SMS1$^1$). For example, the other participant only sees the corrected version of the message: "I bought cotton socks today."

FIG. 9B illustrates example displays that may result from executing one computer-implemented process, such as processes 500 and 600 discussed above, for substituting a word in a read message, in accordance with embodiments. In the illustrated embodiment, the first and second participant interfaces 902A, 902B includes the same messages as in FIG. 9A. However, in 9B, the particular other participant has already read the first message (e.g., SMS1) on the third participant interface 902C. When the correcting participant sends the second message (e.g., SMS2) to substitute the word "cotton" for the word "wool" and the sending participant accepts the edit, this other participant receives a corrected version of the first message (e.g., SMS1$^1$) on the third participant interface 902C. In this example, the system may also highlight the word "wool" to show where the correction was made on the third participant interface 902C.

Computer Program Product

Although the present invention has been described in detail with reference to certain examples thereof, it may be also embodied in other specific forms without departing from the essential spirit or attributes thereof. For example, the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the participant's computer, partly on the participant's computer, as a stand-alone software package, partly on the participant's computer and partly on a remote computer or entirely on the remote computer or server. In the latter scenario, the remote computer may be connected to the participant's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

General

Aspects of the present invention were described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. Moreover, the flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Indeed, other alternative hardware and/or software environments may be used without departing from the scope of the invention.

Therefore, it is desired that the embodiments described herein be considered in all respects as illustrative, not restrictive, and that reference be made to the appended claims for determining the scope of the invention.

What is claimed is:

1. A computer-implemented method comprising:
receiving an original first message from a first participant of a group correspondence;
receiving a second message from a second participant of the group correspondence, wherein the second message is received after the original first message;
determining, by semantically analyzing the original first message and the second message using natural language processing (NLP), that the second message contains a desired modification of the original first message;
semantically analyzing the original first message to identify a location within the original first message for the desired modification, wherein semantically analyzing the original first message to identify the location for the desired modification comprises:
replacing a word in the original first message with a word in the second message to create a candidate message; and
calculating a correctness score for the candidate message, wherein the correctness score is correlated with a degree of compliance with generally accepted grammar rules for a selected human language; and
in response to the determining, automatically modifying the original first message with the desired modification to produce a modified first message.

2. The computer implemented method of claim 1, further comprising:
presenting the modified first message to the first participant of the group correspondence for approval;
in response to an approval by the first participant of the group correspondence, presenting the modified first message to one or more other participants of the group correspondence.

3. The computer-implemented method of claim 2, further comprising, in response to a rejection by the first participant of the group correspondence, presenting the original first message to the one or more other participants of the group correspondence.

4. The method of claim 1, further comprising:
presenting the original first message to one or more other participants of the group correspondence;

determining that the original first message has not been read by the one or more other participants of the group correspondence; and replacing the original first message with the modified first message in a message client associated with the one or more other participants of the group correspondence.

5. The method of claim 4, further comprising:

determining that the original first message has been read by the one or more other participants;

replacing the original first message with the modified first message in a message client associated with the one or more other participants; and highlighting the desired modification in the modified first message in the message client associated with the one or more other participants.

6. The method of claim 1, wherein semantically analyzing the second message comprises determining whether the second message is a valid sentence or a response to a previous message.

7. The method of claim 1, wherein semantically analyzing the original first message to identify the location for the desired modification further comprises:

inserting the second message at a candidate location in the original first message to create a candidate message; and calculating a correctness score for the candidate message.

8. The method of claim 1, wherein semantically analyzing the original first message to identify the location for the desired modification further comprises:

creating a plurality of candidate messages;

calculating a correctness score for each of the plurality of candidate message; and identifying a candidate message with a highest correctness score from the plurality of candidate messages.

9. The method of claim 1, wherein:

the semantically analyzing comprises using natural language processing (NLP) to interpret a meaning of the original first message and the second message in the group correspondence; and the second message does not contain editing commands or editing formatting.

10. A computer-implemented method comprising:

receiving, via a network interface, an original first message from a first participant of a group correspondence;

receiving, via the network interface, a second message from a second participant of the group correspondence, wherein:

the second message is received from the second participant after the original first message from the first participant; and the second message contains a proposed modification of the original first message, wherein the second message was generated by semantically analyzing the original first message to identify a location within the original first message for the desired modification using natural language processing (NLP), wherein semantically analyzing the original first message to identify the location for the desired modification comprises:

replacing a word in the original first message with a word in the second message to create a candidate message; and calculating a correctness score for the candidate message, wherein the correctness score is correlated with a degree of compliance with generally accepted grammar rules for a selected human language;

receiving, via the network interface, a third message, wherein the third message includes control signals indicating that the first participant has approved the proposed modification from the second participant; and in response to the third message, automatically modifying the original first message with the desired modification to produce a modified first message.

11. A text correction system comprising:

a server communicatively coupled to a plurality of message devices, wherein the server comprises a processor coupled to a memory, wherein the processor and the memory are configured to:

receive an original first message from a first participant of a group correspondence;

receive a second message from a second participant of the group correspondence, wherein the second message is received after the original first message;

determine, by semantically analyzing the original first message and the second message by a computer processor, that the second message contains a desired modification of the original first message;

semantically analyze the original first message to identify a location for the desired modification using natural language processing (NLP), wherein the semantic analysis of the original first message to identify the location for the desired modification comprises:

replacing a word in the original first message with the second message to create a candidate message; and calculating a correctness score for the candidate message, wherein the correctness score is correlated with a degree if compliance with generally accepted grammar rules for a selected human language; and in response to the determining, automatically modify the original first message with the desired modification.

12. The text correction system of claim 11, wherein the processor and memory are further configured to:

present the modified first message to the first participant of the group correspondence for approval;

in response to an approval by the first participant of the group correspondence, present the modified first message to one or more other participants of the group correspondence.

13. The text correction system of claim 12, wherein the processor and memory are further configured to, in response to a rejection by the first participant of the group correspondence, present the original first message to the one or more other participants of the group correspondence.

14. The text correction system of claim 11, wherein semantically analyzing the second message comprises determining whether the second message is a valid sentence or a response to a previous message.

15. The text correction system of claim 11, wherein the semantic analysis of the original first message to identify the location for the desired modification comprises:

inserting the second message a candidate location in the original first message to create a candidate message; and calculating a correctness score for the candidate message.

16. The text correction system of claim 11, wherein the semantic analysis of the original first message to identify the location for the desired modification comprises:

creating a plurality of candidate messages;
calculating a correctness score for each of the plurality of candidate message; and
identifying a candidate message with a highest correctness score from the plurality of candidate messages.

17. The text correction system of claim 11, wherein:
semantically analyzing comprises using natural language processing (NLP) to interpret a meaning of the original first message and the second message in the group correspondence; and
the second message consists of a human language word or phrase.

18. A messaging client, comprising:
a processor coupled to a memory, wherein the processor and the memory are configured to:
receive an original first message from a first participant of a group correspondence;
receive a second message from a second participant of the group correspondence, wherein:
the second message is received from the second participant after the original first message from the first participant; and
the second message contains a proposed modification of the original first message, wherein the second message was generated by semantically analyzing the original first message to identify a location within the original first message for the desired modification using natural language processing (NLP), wherein semantically analyzing the original first message to identify the location for the desired modification comprises:
replacing a word in the original first message with a word in the second message to create a candidate message; and
calculating a correctness score for the candidate message, wherein the correctness score is correlated with a degree of compliance with generally accepted grammar rules for a selected human language;
receive a third message, wherein the third message includes control signals indicating that the first participant has approved the proposed modification from the second participant; and
in response to the third message, automatically modify the original first message with the desired modification.

19. A computer program product comprising a computer-readable storage medium having program instructions embodied therewith, the program instructions executable by a processor to cause the processor to:
receive an original first message from a first participant of a group correspondence;
receive a second message from a second participant of the group correspondence, wherein the second message is received after the original first message;
determine, by semantically analyzing the original first message and the second message using natural language processing (NLP), that the second message contains a desired modification of the original first message;
semantically analyze the original first message to identify a location for the desired modification, wherein the semantic analysis of the original first message to identify the location for the desired modification comprises:
replacing a word in the original first message with the second message to create a candidate message; and
calculating a correctness score for the candidate message, wherein the correctness score is correlated with a degree if compliance with generally accepted grammar rules for a selected human language; and
in response to the determining, automatically modify the original first message with the desired modification to produce a modified first message.

20. The computer program product of claim 19, further comprising program instructions to:
present the modified first message to the first participant of the group correspondence for approval;
in response to an approval by the first participant of the group correspondence, present the modified first message to one or more other participants of the group correspondence.

21. The computer program product of claim 20, further comprising program instructions to, in response to a rejection by the first participant of the group correspondence, present the original first message to the one or more other participants of the group correspondence.

* * * * *